United States Patent [19]

Nonomura et al.

[11] 4,373,784
[45] Feb. 15, 1983

[54] ELECTRODE STRUCTURE ON A MATRIX TYPE LIQUID CRYSTAL PANEL

[75] Inventors: Keisaku Nonomura, Nara; Toshiaki Takamatsu, Tenri; Hisashi Uede, Yamatokoriyama; Tomio Wada, Nara, all of Japan

[73] Assignee: Sharp Kabushiki Kaisha, Osaka, Japan

[21] Appl. No.: 143,097

[22] Filed: Apr. 24, 1980

[30] Foreign Application Priority Data

Apr. 27, 1979 [JP] Japan ............................ 54-57206[U]

[51] Int. Cl.³ .............................................. G02F 1/133
[52] U.S. Cl. .................................. 350/336; 340/784; 350/335
[58] Field of Search ................ 350/335, 336, 392; 340/716, 784

[56] References Cited

U.S. PATENT DOCUMENTS

| 3,936,816 | 2/1976 | Murata | 350/336 X |
| 3,938,134 | 2/1976 | Hackstein et al. | 350/335 X |
| 4,231,640 | 11/1980 | Funada et al. | 350/335 X |

FOREIGN PATENT DOCUMENTS

| 54-106189 | 8/1979 | Japan | 340/784 |
| 54-106192 | 8/1979 | Japan | 340/784 |
| 54-128751 | 10/1979 | Japan | 350/339 F |
| 54-152895 | 12/1979 | Japan | 340/784 |

*Primary Examiner*—F. L. Evans
*Attorney, Agent, or Firm*—Birch, Stewart, Kolasch & Birch

[57] ABSTRACT

An electrode structure on a matrix type liquid crystal display panel includes M column electrodes and N row electrodes both of which cross each other at a right angle to define picture elements via a layer of liquid crystal material. The matrix shaped electrode structure is such that a third picture element C $(X_m', X_n')$ is located between a first picture element A $(X_m, Y_n)$ and a second picture element B $(X_{m+1}, Y_{n+1})$, wherein $1 \leq m \leq M$ and $1 \leq n \leq N$, thus enhancing resolution in vertical and horizontal directions. A diamond shape is exemplary of the possible shapes of the picture elements wherein each pair of the diagonally disposed corners are connected to that of their adjacent elements.

5 Claims, 6 Drawing Figures

ELECTRODE STRUCTURE ON A MATRIX TYPE LIQUID CRYSTAL PANEL

BACKGROUND OF THE INVENTION

The present invention relates to an electrode structure on a matrix type liquid crystal display panel.

In recent years, a substantial amount of effort in the field of liquid crystal matrix displays has been devoted to providing a high-density multi-line display, aiming at an improvement in image quality. Liquid crystal displays with matrix shaped electrode structures are quite favorable to fulfilling a power saving demand because of their capability of being excited with low power consumption.

A conventional drive technique for such a matrix type liquid crystal display, for example, the line sequential drive method as shown in FIG. 1, has long been known. A main memory 1 stores characters, symbols, patterns or the like and an intelligence signal converter 2 converts data contained in the memory 1 into the associated display patterns. After those patterns are stored line by line into a buffer memory in a column driver 3, respective column electrodes $Y_1, Y_2, \ldots Y_n$ are supplied with those patterns. Row electrodes $X_1, X_2, \ldots X_m$ crossing the column electrodes, on the other hand, are sequentially enabled through a row driver 4, thereby displaying information contained in the buffer memory in a line-by-line fashion. A control 5 provides an operation control for the row and column driver circuits. A liquid crystal display with a matrix type electrode structure is labeled 6.

For the matrix type liquid crystal display panel, the greater the number of the rows (scanning line number) the higher the density and accuracy of display. However, with an increase in the number of the rows, the length of time at which a signal is applied per column, i.e., duty factor, is shortened and the problem of crosstalking arises. In particular, liquid crystal display panels show dull threshold characteristics and slow response characteristics, making it difficult to assure satisfactory contrast. There have been several attempts to overcome the problem, including:

(1) The development of liquid crystal material having more definite threshold properties;

(2) A matrix address scheme in the optimum condition with an extended operating margin ($\alpha = V_{on}/V_{off}$); and (3) The design of an electrode structure with a seemingly higher resolution.

Though the first two attempts (1) and (2) do not require modifications in the well known structure of liquid crystal cells, it appears almost impossible to increase drastically the number of excitable lines from the viewpoint of the present-day progress of liquid crystal materials, etc. Contrarily, the problem with the last method (3) is that the liquid crystal cells are sophisticated in construction but, it is actually possible to increase the number of excitable lines by a factor of two or more.

Typical ways of making possible the last approach (3) are as follows:

(a) double electrode structure
(b) vertical partition, and
(c) two-layered structure.

These methods may be adopted alone or in combination for achieving the intended purpose. Such a combination has been proposed by co-pending application Ser. No. 921,062 June 30, 1978, MATRIX TYPE LIQUID CRYSTAL DISPLAY PANEL by F. Funada et al, now U.S. Pat. No. 4,231,640.

OBJECTS AND SUMMARY OF THE INVENTION

The present invention provides a new and useful liquid crystal display panel of the matrix type which, while being somewhat similar to the double electrode structure method (a), does not adopt any of the above-listed methods (a) to (c).

With the matrix type double electrode structure having column electrodes and row electrodes intersecting each other at a right angle to define rectangular picture elements, it is conventional to interconnect the respective rectangular picture elements by the use of strip-shaped connection electrodes such that each of the row electrodes (scanning side electrodes) faces against a couple of the picture elements. As indicated in FIG. 2, a couple of picture elements 1, 1' are arranged to face against a single row electrode $Y_{j-1}$ with the remaining picture elements facing similarly against each row electrode $Y_1, Y_2, \ldots Y_{j-1}, Y_j, \ldots Y_n$, that is, a two-to-one relationship. Each of the picture elements 1, 1' is interconnected with connection electrodes 2, 2'. The connection electrodes 2, 2' and the picture elements constitute the respective column electrodes $X_1, X_2, \ldots X_{2i-1}$, $X_{2i}, X_m$. The two column electrodes $X_{2i-1}$ and $X_{2i}$ (i: a natural number) apparently constitute a single column electrode. The above mentioned double electrode structure is more attractive than a simple (a single-layered) matrix structure in that the double electrode structure permits twice the excitement of the row electrodes as twice as without the need for changing the duty factor.

However, the prior art structure, as discussed previously, suffers from the inherent problem of the connection electrodes 2, 2' interconnecting the picture elements 1, 1' being extremely narrow and easily broken during etching. In order to display very fine images, it is desirable that the respective picture elements be as wide as possible and the width and spacing of the connection electrodes 2, 2' be as small as possible. If the width of each connection electrode is selected to be very narrow, then the formation of an electrode pattern would be very difficult. Further, if it is designed to be narrow and long, then another problem arises in that a resulting voltage drop prevents the electrodes at an edge portion of the panel from being supplied with a sufficient voltage.

With the foregoing in mind, it is an object of the present invention to provide a unique electrode configuration which is able to remarkably shorten the length of the connection electrodes 2, 2' and even eliminate the need for the connection electrodes by virtue of a particular shape and alignment of the respective rectangular-shaped picture elements 1, 1'.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF PREFERRED EMBODIMENTS OF THE INVENTION

Figure 3:
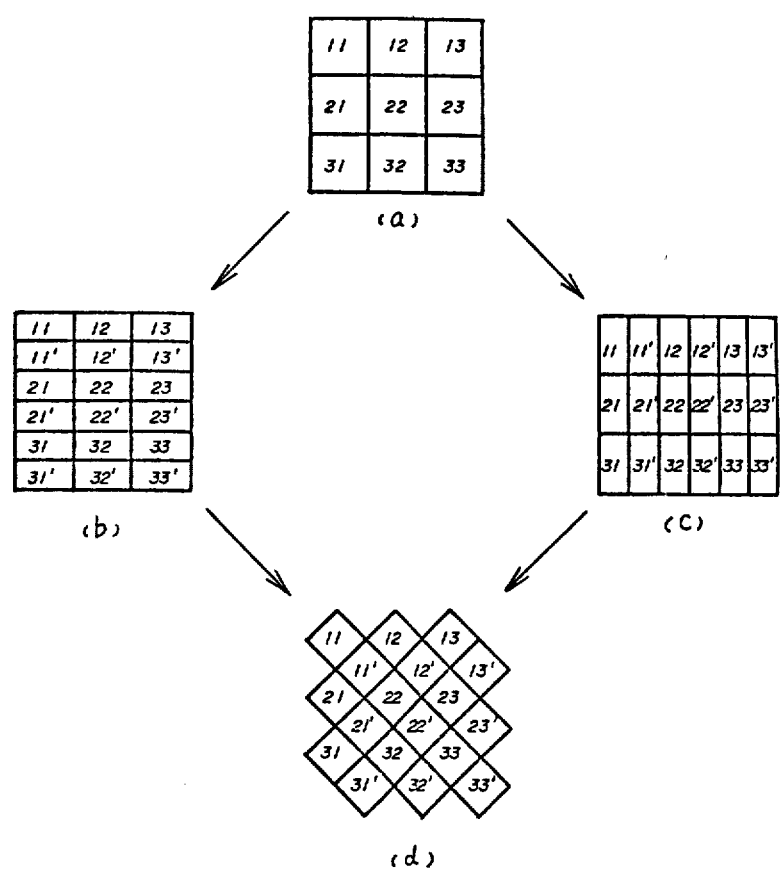
FIG. 3 is an explanation diagram of a matrix type electrode pattern constructed in accordance with the principle of the present invention.

FIGS. 3(a), 3(b) and 3(c) are diagrams for explaining the principle of the present invention for patterning a matrix type electrode structure. FIG. 3(a) shows a simple and old-fashioned matrix arrangement of picture elements. As depicted in FIG. 3(b) or 3(c), the area of each picture element is reduced to one half by spliting the matrix in a vertical direction or horizontal, thus doubling resolution in a verical direction or horizontal. In FIG. 3(b), however, the number of scanning lines doubles making it incapable of enhancing resolution in a horizontal direction. Similarly, the example of FIG. 3(c) faces difficulty in enhancing resolution in a vertical direction. To overcome these problems, an additional third picture element $C(x_m', y_n')$ between a first specific picture element A $(X_m, Y_n)$ and a second specific picture element B $(X_{m+1}, Y_{n+1})$. The third element C is positioned adjacent to the right lower side of the first is provided picture element A resting both on a matrix display panel having M column electrodes and N row electrodes wherein $1 \geq m \geq M$, $1 \geq n \geq N$. Such addition of the third picture element C $(X_m', Y_n')$ assures an increased resolution in both the vertical and horizontal directions. This configuration is best shown in FIG. 3(d) wherein the third picture element 12' is interposed between element 12 and element 23, for example.

Figure 4:
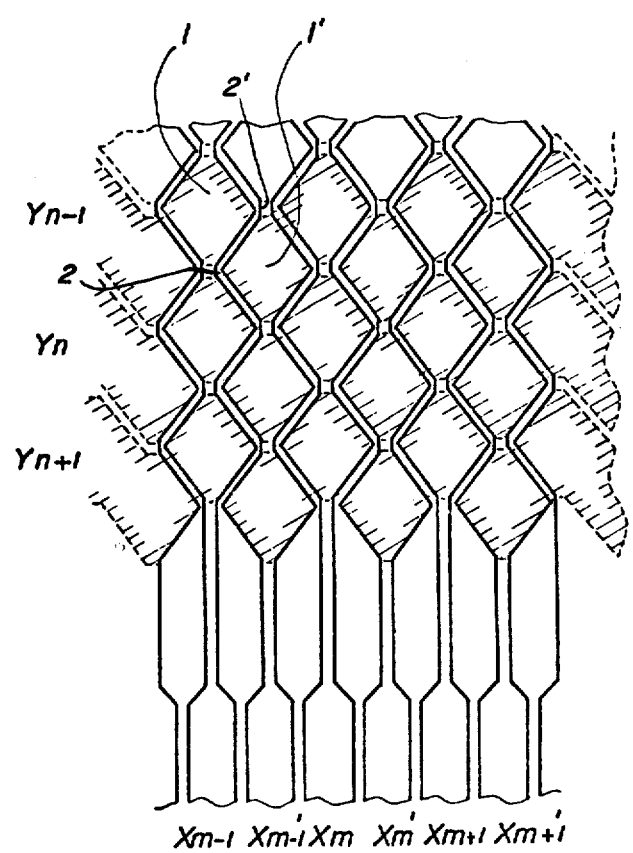
FIGS. 4 through 6 are enlarged views of exemplary embodiments of the present invention.
Figure 5:
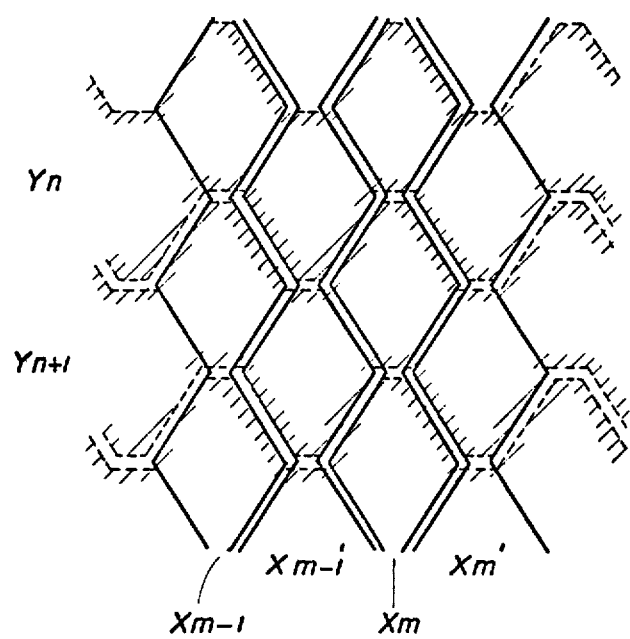
Figure 6:
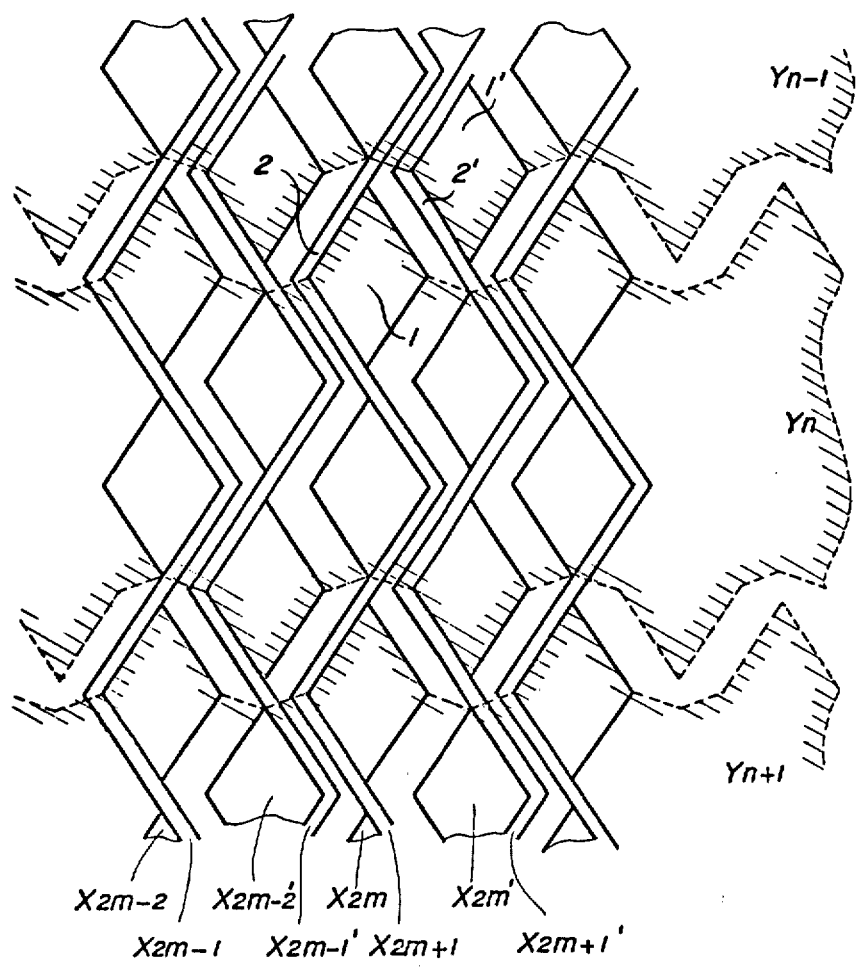

FIGS. 4 through 6 are schematic diagrams showing some exemplary electrode patterns constructed in accordance with preferred embodiments of the present invention. The picture elements 1, 1' of FIG. 4 are formed in a diamond shape and aligned in a spaced relationship with the row electrodes $Y_{n-1}$, $Y_n$ and so forth. The respective two picture elements 1, 1' adjacent along a diagonal line are interconnected by the connection electrodes 2, 2', thus constituting the respective column electrodes $X_{m-1}$, $X_{m-1}'$, $X_m$ and so forth. It is to be understood that the connection electrodes 2, 2' may be shortened as much as possible since they have only to interconnect a pair of diagonally disposed corners of the picture elements 1, 1'. In addition, each of the row electrodes $Y_n$ serves in cooperation with each couple of the column electrodes $X_n$, $X_n'$, with its periphery substantially in register with the extreme outer edges of the picture elements 1, 1' as defined by the column electrodes $X_n$, $X_n'$.

In FIG. 5, the picture elements 1, 1' are connected directly to each other at the corner without using the connection electrodes 2, 2' as depicted in FIG. 4.

FIG. 6 shows another example of an electrode pattern in which the connection electrodes 2, 2' extend along each side edge of the picture elements 1, 1' and the respective picture elements 1, 1' are connected in a column direction to form each bunch of the column electrodes. Each bunch of the column electrodes includes the lines $X_{2m-2}$, $X_{2m-2}'$, $X_{2m}$, $X_{2m}'$ and so forth each leading to the picture elements 1, 1' and the lines $X_{2m-1}$, $X_{2m-1}'$, $X_{2m+1}$, $X_{2m+}'$ and so forth each leading to the connection electrodes 2, 2'. It is noted that in this case the connection electrodes 2, 2' may be relatively wide because of forming a part of the column electrodes.

Figure 1:
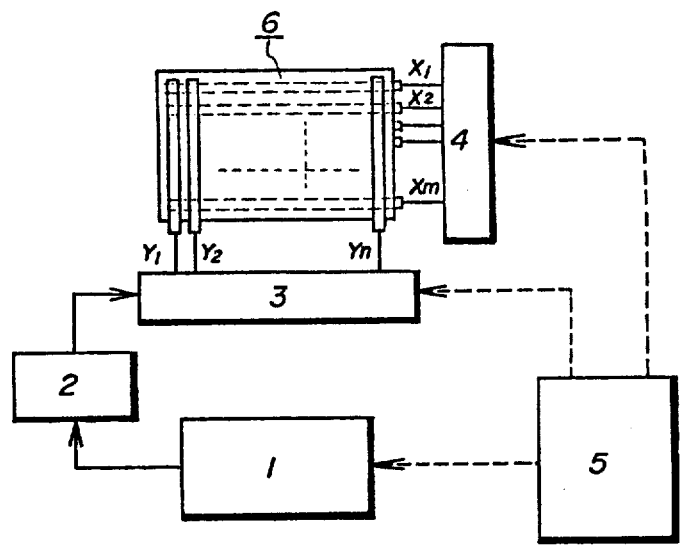
FIG. 1 is a schematic diagram of driving circuitry for a matrix type liquid crystal display panel.
Figure 2:
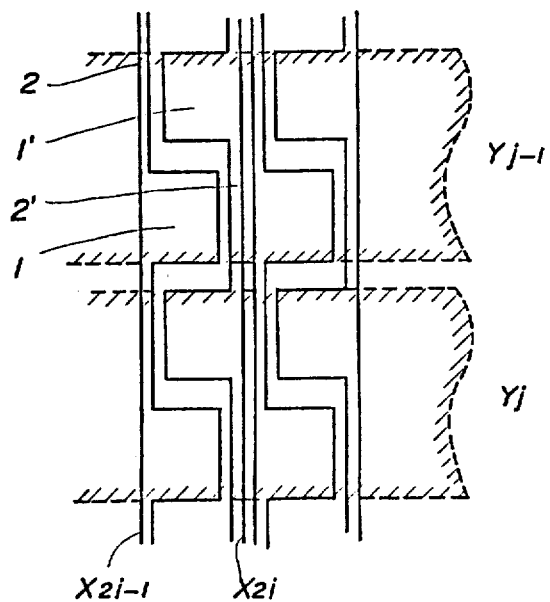
FIG. 2 is an enlarged view of an electrode pattern of the prior art matrix type liquid crystal display panel.

In sharp contrast to the prior art double electrode structure of FIG 2, the connection portions of the present invention disposed between the two adjacent picture elements are extremely short and easy to manufacture and further and in overcoming the problem of voltage drop caused by electrode resistance. It also possible with the present invention to double the number of excitable scanning lines in the same manner as with prior art double electrode structure by disposing the picture elements in a face-to-face relationship with the row electrodes.

As is clear in the art, it is possible to combine the above discussed attempts (a) to (c) together, that is, the double electrode structure, the vertical partition and the two-layered structure methods. A combination of the three methods enables the number of excitable scanning lines to be increased up to sixteen times that of the old-fashioned matrix structure without encountering deteriorating contrast.

Whereas the present invention has been described with respect to specific embodiments thereof, it will be understood that various changes and modifications will be suggested to one skilled in the art, and it is intended to encompass such changes and modifications as fall within the scope of the appended claims.

We claim:

1. A matrix type liquid crystal display device comprising:
    a plurality of column electrodes;
    a plurality of row electrodes corresponding to and generally orthagonal to said column electrodes whereby, corresponding row and column electrodes form diamond-shape picture elements;
    each of said diamond-shaped picture elements having a first pair of opposed apices arranged along a line generally extending in the direction of said column electrodes and a second pair of opposed apices arranged along a line generally extending in the direction of said row electrodes;
    said first pair of opposed apices of adjacent picture elements being connected to form said column electrodes; and
    a layer of liquid crystal material disposed between said column and row electrodes.

2. A matrix type liquid crystal display device as in claim 1, wherein said row electrodes are generally zigzag-like in shape.

3. A matrix type liquid crystal display device as in claim 1, wherein said first pair of opposed apices of adjacent picture elements are connected by a connectin electrode generally extending in the direction of said column electrodes.

4. A matrix type liquid crystal display device as in claim 1, wherein said first pair of opposed apices of adjacent picture elements are directly connected such that the diagonal side of a first picture element directly connects to the corresponding transversely adjacent diagonal side of an adjacent picture element thereby forming said column electrodes.

5. A matrix type liquid crystal display device as in claim 1, wherein said first pair of opposed apices of adjacent picture elements are directly connected without the use of a connection electrode.

* * * * *